(12) United States Patent
Fonkenell (10) Patent No.: US 7,972,108 B2
(45) Date of Patent: Jul. 5, 2011

(54) TURBINE AND HYDROELECTRIC POWER PLANT FOR VERY LOW HEAD

(76) Inventor: Jacques Fonkenell, Izeaux (FR)

( * ) Notice: Subject to any disclaimer, the term of this patent is extended or adjusted under 35 U.S.C. 154(b) by 1028 days.

(21) Appl. No.: 10/580,082

(22) PCT Filed: Nov. 18, 2004

(86) PCT No.: PCT/FR2004/002949
§ 371 (c)(1),
(2), (4) Date: Mar. 8, 2007

(87) PCT Pub. No.: WO2005/054667
PCT Pub. Date: Jun. 16, 2005

(65) Prior Publication Data
US 2007/0286715 A1 Dec. 13, 2007

(30) Foreign Application Priority Data

Nov. 20, 2003 (FR) ...................... 03 50862

(51) Int. Cl.
*F03B 3/04* (2006.01)
(52) U.S. Cl. .................. 415/126; 415/121.1; 415/121.2; 415/221; 416/189; 416/198 R
(58) Field of Classification Search .................. 415/191, 415/211.2, 220, 221, 121.1, 121.2, 126; 416/189, 416/198 R; 290/43, 54
See application file for complete search history.

(56) References Cited

U.S. PATENT DOCUMENTS

| | | | | |
|---|---|---|---|---|
| 2,054,142 A | | 11/1933 | Sharp | |
| 2,015,332 A | * | 9/1935 | Baumann | 416/219 R |
| 2,897,375 A | * | 7/1959 | Fevre | 405/78 |
| 3,785,747 A | | 1/1974 | Mayo, Jr. | |
| 4,064,403 A | * | 12/1977 | Miller | 290/52 |
| 4,258,271 A | * | 3/1981 | Chappell et al. | 290/54 |
| 4,441,029 A | * | 4/1984 | Kao | 290/52 |
| 4,468,153 A | * | 8/1984 | Gutierrez Atencio | 405/78 |
| 4,629,904 A | * | 12/1986 | Rojo et al. | 290/52 |
| 4,648,244 A | * | 3/1987 | Mayo et al. | 60/398 |
| 4,764,087 A | * | 8/1988 | Pham-Phu | 415/142 |

FOREIGN PATENT DOCUMENTS

| | | |
|---|---|---|
| FR | 518877 | 6/1921 |
| WO | WO 91/09193 | 6/1991 |
| WO | WO 03/083291 | 10/2003 |

OTHER PUBLICATIONS

International Search Report dated Oct. 4, 2005.

* cited by examiner

*Primary Examiner* — Ninh H Nguyen
(74) *Attorney, Agent, or Firm* — Howard IP Law Group, PC (57) ABSTRACT

A turbine for a hydroelectric power plant intended to equip a water stream at the level of a very low head lower than 10 meters, and preferably from 1 to 5 meters, comprising a helix-shaped wheel, the ratio between the kinetic energy of the water flow coming out of the wheel and the potential energy of the head being smaller than 20%.

10 Claims, 7 Drawing Sheets

TURBINE AND HYDROELECTRIC POWER PLANT FOR VERY LOW HEAD

CLAIM FOR PRIORITY

This application claims the benefit of French Application No. 03/50862, filed Nov. 20, 2003 and Intl Application No. PCT/FR2004/002949, filed Nov. 18, 2004, and is incorporated herein by reference.

The present invention relates to a very low head hydroelectric power plant turbine and a very low head hydroelectric power plant.

In a hydroelectric power plant, potential energy stored in the water accumulated in a dam or drawn into a water intake is used to power the wheel of a turbine. The potential energy then turns into mechanical energy. The turbine, in turn, drives a generator which converts the mechanical energy into electric energy.

Hydroelectric power plants are different according to the features of the equipped sites. In particular, low-head hydroelectric power plants for which the height between the water level upstream of the plant and the water level downstream of the hydroelectric power plant, or head height, is lower than approximately 30 meters, and more specifically, very low head hydroelectric power plants for which the head height is lower than approximately 10 meters can be distinguished.

Figure 1:
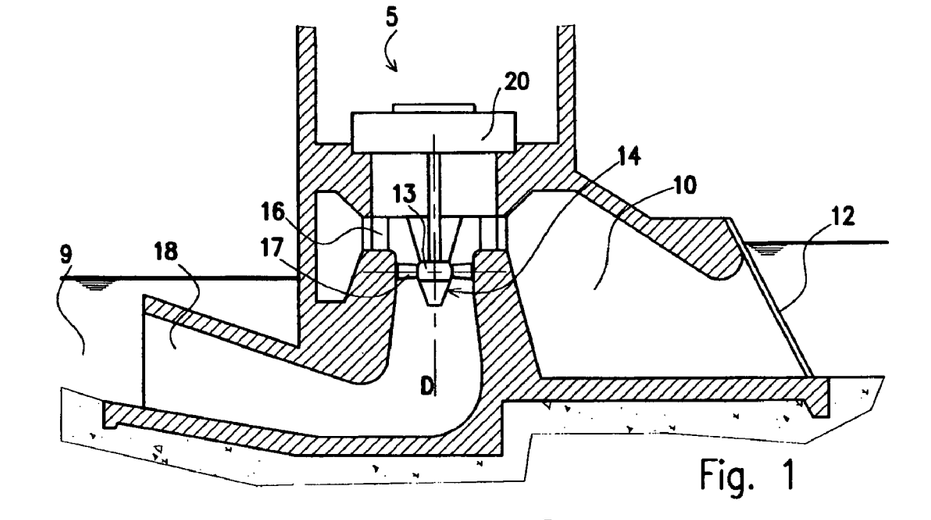
FIGS. 1 and 2, previously described, schematically show cross-section views of conventional hydroelectric power plants for very low heads.
Figure 2:
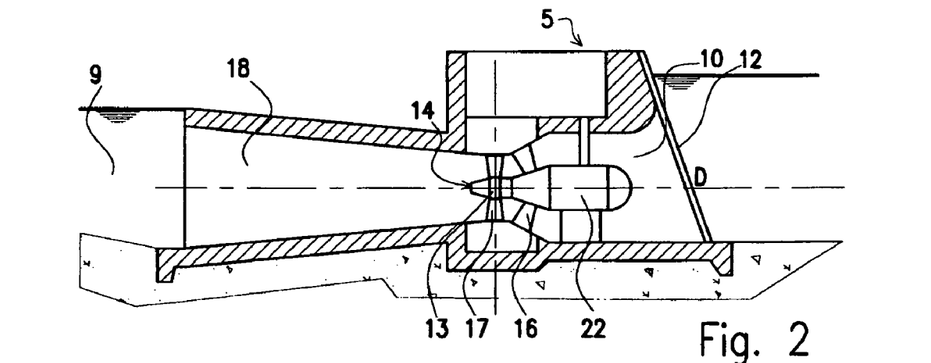

FIGS. 1 and 2 each schematically show a partial view of a conventional hydroelectric power plant 5 harnessing a very low head. It comprises a water intake passage 10 having its inlet protected by a bar screen 12. A screen washing system, not shown, is also provided to avoid clogging-up of bar screen 12. Water intake passage 10 generally has a convergent shape which guides the water towards a wheel 13 of a turbine 14 of axis D. A distributor 16 is provided in water intake passage 10 upstream of turbine 14 to properly direct the water flow with respect to blades 17 of wheel 13 of turbine 14. Turbine 14 of a low-head or very low head hydroelectric power plant 5 generally is a Kaplan turbine, which has the shape of a helix and which generally comprises adjustable blades 17. A draft tube 18 guides the water from the outlet of turbine 14 towards a tail race 9. Turbine 14 can be stopped by means of the closing of distributor 16 generally equipped with movable wicket gates.

In FIG. 1, axis D of turbine 14 is arranged substantially vertically. Turbine 14 drives an electric generator 20 arranged outside of the flow.

In FIG. 2, axis D of turbine 14 is substantially horizontal. The electric generator (not shown) is arranged in a bulb-shaped carter 22 placed in the flow.

A Kaplan-type turbine generally has an optimal efficiency for a specific rotation speed of wheel 13. Water intake passage 10 aims at accelerating the water flow up to a velocity adapted to the optimal efficiency rotation speed of wheel 13. The velocity of the water coming out of wheel 13 is higher than the flow velocity upstream of hydroelectric power plant 5. Draft tube 18 aims at slowing down the flow coming out of wheel 13 and thus enables recovering as much of the kinetic energy remaining in the flow coming out of turbine 14 as possible.

Generally, a ratio K characteristic of a turbine 14 of a given hydroelectric power plant type corresponding to the ratio between the kinetic energy of the flow coming out of wheel 13 and the potential energy of the head is defined. Ratio K, expressed in %, is given by the following relation:

$$K = 100 * V^2 / 2gH$$

where V is the average speed of the flow coming out of wheel 13, g is the gravitation constant and H the head height. Ratio K is representative of the energy still contained in the flow in kinetic form when coming out of wheel 13, divided by the energy available for the turbine, and is thus representative of the energy to be recovered by draft tube 18.

The higher ratio K, the greater the slowing down to be performed by draft tube 18. For conventional low-head Kaplan turbines, Mr. Joachim Raabe, in its work entitled "Hydro Power", indicates that ratio K respectively is 30%, 50%, and 80% for 70-meter, 15-meter, and 2-meter heads. The high kinetic energy to be recovered in very low head turbines at the outlet of wheel 13 leads to constructing very large draft tubes since their divergence is limited by risks of separation of the liquid vein.

The forming of water intake passage 10 and of draft tube 18 of hydroelectric power plant 5 thus requires the forming of large civil engineering constructions. The very high cost of such constructions considerably burdens the total cost of the plant and has strongly limited the construction of hydroelectric power plants on low heads and very low heads for which coefficient K is particularly high.

The present invention aims at providing a turbine for a hydroelectric power plant adapted to very low heads having a water intake passage and a draft tube of small dimensions, or even non-existent.

To achieve this object, the present invention provides a turbine for a hydroelectric power plant intended to equip a water stream at the level of a very low head lower than 10 meters, and preferably from 1 to 5 meters, comprising a helix-shaped wheel, the ratio between the kinetic energy of the water flow coming out of the wheel and the potential energy of the head being smaller than 20%.

According to an embodiment of the invention, the diameter of the wheel is greater than 3 meters.

According to an embodiment of the invention, the rotation speed of the wheel is lower than 50 revolutions per minute.

According to an embodiment of the invention, the turbine comprises a carter crossed by an opening comprising a cylindrical portion, the wheel comprising blades arranged at the level of the cylindrical portion; a hub on which the blades are assembled; a fixed box, the hub being rotatably assembled on the fixed box; and a distributor upstream of the wheel with respect to the water flow and comprising profiles connecting the fixed box to the carter.

According to an embodiment of the invention, the opening comprises a converging portion upstream of the cylindrical portion with respect to the water flow and a diverging portion downstream of the cylindrical portion with respect to the water flow, the ratio between the thickness of the carter according to the rotation axis of the wheel and the wheel diameter being smaller than 0.5.

According to an embodiment of the invention, the distributor comprises profiles distributed in a star around the fixed box, the turbine comprising a screen washing system upstream of the distributor with respect to the water flow and comprising at least one arm rotatably assembled around the fixed box to drive away bulky bodies maintained against the distributor.

According to an embodiment of the invention, the turbine comprises means for orienting the blades to adapt the turbine flow rate to the flow rate of the head and/or to close the carter opening.

According to an embodiment of the invention, the turbine comprises a hydraulic pump driven by the wheel.

The present invention also provides a hydroelectric power plant intended to equip a water stream at the level of a very low head lower than 10 meters, for example, ranging between 1 and 5 meters, comprising a turbine comprising a helix-shaped wheel, the ratio between the kinetic energy of the water flow outlet of the wheel and of the potential energy of the head being smaller than 20%.

According to an embodiment of the invention, the plant comprises a support delimiting a flow passage in which the head is created and in which the turbine is arranged, and means for displacing the turbine with respect to the support between a first position where the turbine completely closes the passage and at least one second position where the turbine partially closes the passage.

The foregoing object, features, and advantages of the present invention, as well as others, will be discussed in detail in the following non-limiting description of specific embodiments in connection with the accompanying drawings, among which.

Figure 3:
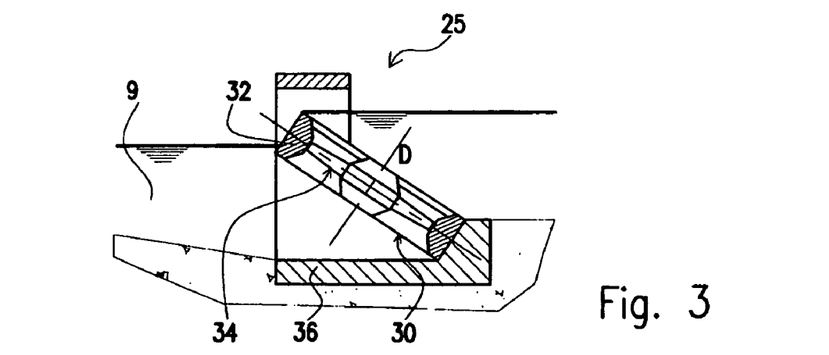
FIG. 3 schematically shows a cross-section view of a hydroelectric power plant according to the present invention.

FIG. 3 schematically shows a cross-section view of a hydroelectric power plant 25 according to the present invention substantially at the same scale as hydroelectric power plants 5 of FIGS. 1 and 2. Hydroelectric power plant 25 equips a very low head, the head height of which is substantially the same as the head height in FIG. 1 or 2, that is, lower than 10 meters and preferably from 1 to 5 meters.

Hydroelectric power plant 25 according to the present invention provides the use of a turbine 30 of axis D comprising a carter 32 in which is arranged a wheel 34 having a large diameter and being capable of operating at a rotation speed of a few tens of revolutions per minute, for example, from 10 to 50 revolutions per minute. Such a rotation speed is compatible with a flow velocity close to the normal velocity of the flow upstream of hydroelectric power plant 25. This enables decreasing to a minimum the dimensions of the water intake passage and of the draft tube provided at the level of carter 32. Carter 32 can thus be comprised within a parallelepiped of small thickness maintained by a concrete stand 36 of reduced dimensions as compared with civil engineering works to be provided for conventional hydroelectric power plants. As an example, for a head of approximately 1.5 meters and a flow 30-m$^3$/s rate, hydroelectric power plant 25 according to the present invention enables obtaining a 280-kW electric power, for a turbine 30 having a diameter of approximately 5 meters and rotating at approximately 20 revolutions/min. Ratio K is then equal to 11%. Carter 32 is then substantially comprised within a parallelepiped having its thickness along axis D equal to approximately 1.9 meters, having its width, corresponding to the distance between vertical walls 40, 41, equal to approximately 6.4 meters, and having its height along the direction perpendicular to axis D equal to approximately 6.9 meters. More generally, turbine 30 according to the present invention can harness a hydro-electric power plant on very low heads lower than 10 meters. Ratio K of turbine 30, such as defined previously, is lower than 20% for such heads.

Figure 4:
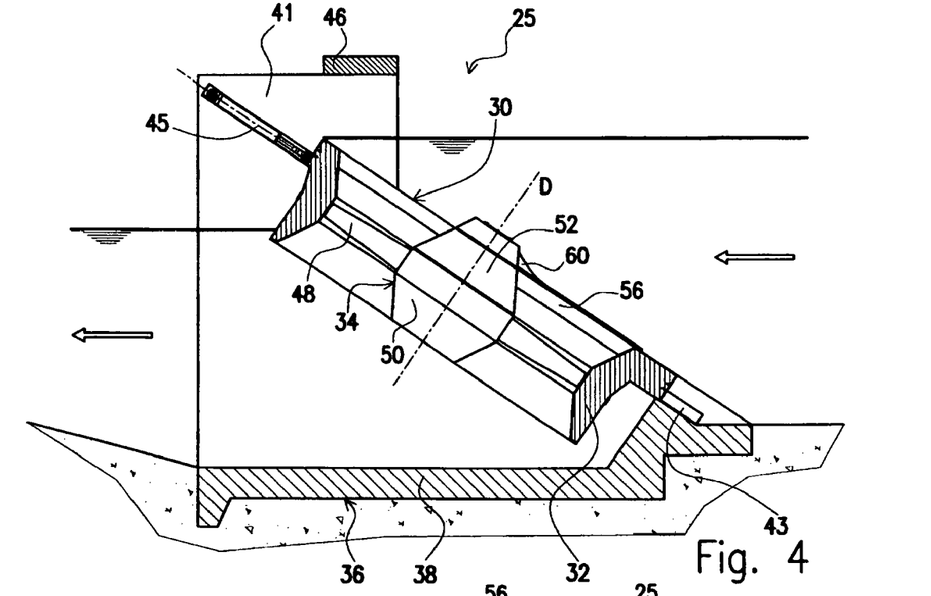
FIG. 4 shows in more detailed fashion a cross-section view of an example of embodiment of a hydroelectric power plant according to the present invention.
Figure 5:
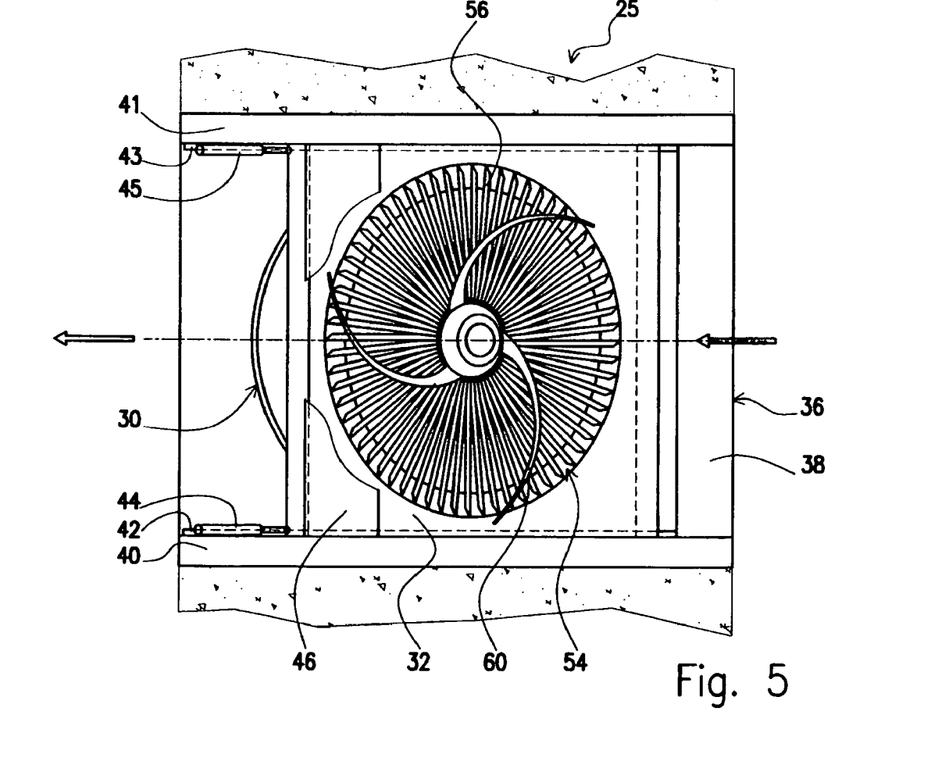
FIG. 5 shows a top view of the hydroelectric power plant of FIG. 4.

FIGS. 4 and 5 respectively show a cross-section view and a top view of a more detailed example of embodiment of hydroelectric power plant 25 according to the present invention. The water flow direction is indicated by arrows. Carter 32 of turbine 30 is maintained in position with respect to the flow by support 36 comprising a base 38 and two vertical walls 40, 41. Carter 32 is adapted to sliding in parallel grooves 42, 43 inclined with respect to the vertical direction, formed in vertical walls 40, 41. The inclination angle of axis D of turbine 30 with respect to the vertical direction depends on the inclination angle of grooves 42, 43 with respect to the vertical direction. This angle is selected especially according to the head height, to the depth of the water stream, to the diameter of wheel 34, and to the thickness of carter 32. In the previously-described example, the rotation axis of wheel 34 is inclined by approximately 34° with respect to the vertical direction. Two hydraulic jacks 44, 45 are capable of sliding carter 32 into grooves 42, 43. The position of carter 32 in FIGS. 4 and 5 correspond to the normal operation of hydroelectric power plant 25. A platform 46 (partially shown in FIG. 4) enables straddling turbine 30, especially for maintenance purposes.

Wheel 34 of turbine 30 comprises adjustable blades 48 connected to a hub 50. Hub 50 is rotatably assembled around axis D with respect to a fixed box 52 connected to carter 32 by a distributor 54. Distributor 54 comprises an assembly of fixed profiles 56 which radiate from fixed box 52 to carter 32. Profiles 56 direct the flow towards blades 48 so that the flow reaches blades 48 according to a proper orientation. Further, the number of profiles 56 and the interval between profiles 56 enable profiles 56 to behave as a protection screen of wheel 34 of turbine 30 by preventing bulky bodies from reaching wheel 34. The cleaning of distributor 54 is ensured by a screen washing system of rotating type comprising three mobile arms 60 rotatably assembled around fixed box 52. The device for rotating the screen washing system is not shown.

Figures 6, 7, 8:
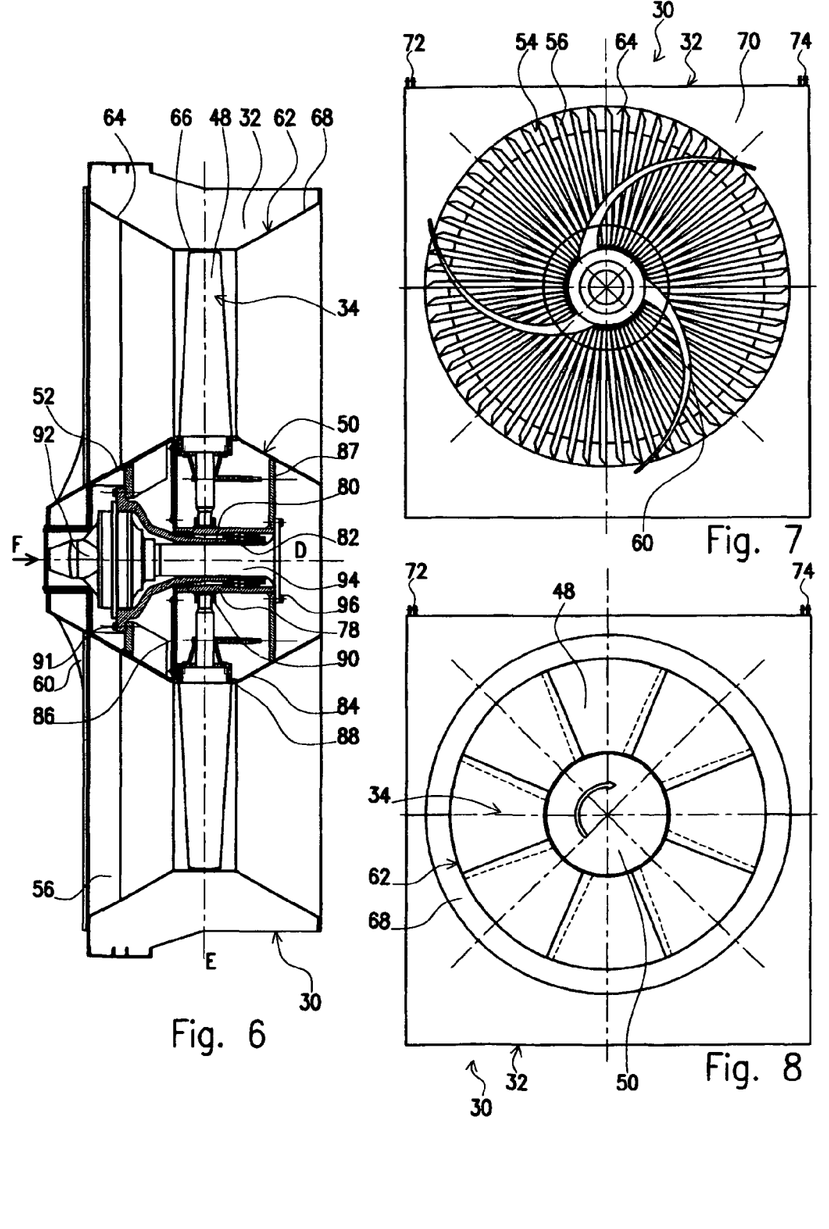
FIG. 6 shows a more detailed cross-section view of the turbine of the hydroelectric power plant of FIG. 4 according to a plane containing the turbine axis.
FIG. 7 shows a view of the turbine of FIG. 6 along direction F.
FIG. 8 shows a view of the turbine of FIG. 6 along direction F without the distributor.

FIG. 6 shows a more detailed cross-section view of turbine 30 of FIG. 4. Carter 32 is crossed by an opening 62 which comprises a converging upstream portion 64, for example, conical, behaving as a water intake passage, a cylindrical central portion 66, and a diverging downstream portion 68, for example, behaving as a draft tube. Blades 48 of wheel 34 are placed substantially at the level of cylindrical portion 66 of opening 62.

FIGS. 7 and 8 show views of turbine 30 of FIG. 6 along direction F, distributor 54 not being shown in FIG. 8. Carter 32 is formed of a front parallelepipedal block 70 comprising two blocks 72, 74 for the connection of hydraulic jacks 44, 45. Wheel 34 comprises eight adjustable blades 48 that can be oriented to partially overlap as illustrated by the dotted lines.

As shown in FIG. 6, hub 50 comprises an internal cylindrical portion 78 rotatably assembled on a fixed tubular element 80 via a roller bearing device 82. Internal cylindrical portion 78 is connected to an external portion 84 via front and rear planar ring-shaped walls 86, 87. Each blade 48 is supported by hub 50 via a first bearing 88 at the level of external portion 84 and a second bearing 90 at the level of internal cylindrical portion 78. Bearings 88, 90 define for each blade 48 a pivoting axis E.

Hollow tubular element 82 is attached to fixed box 52 by screws 91. A hydraulic pump 92 is arranged in fixed box 52. Hydraulic pump 92 is driven by a rotating shaft 94 having its end attached to rear wall 87 of hub 50 via screws 96. Hydraulic pump 92 is connected to a hydraulic motor (not shown) by pipes (not shown) conveying hydraulic fluid under pressure. The hydraulic pump and motor assembly forms a conventional hydrostatic transmission. The hydraulic motor drives an electric generator (not shown). The hydraulic motor and the electric generator are advantageously separated from turbine 30. As an example, the pipes connecting hydraulic pump 92 to the hydraulic motor are especially arranged in fixed profiles 56 of distributor 54 to connect hydraulic pump 92 to carter 32.

In normal operation, when a sufficient water flow crosses opening 62 of carter 32, blades 48 of wheel 34 are rotated around axis D. Hub 50 is then rotated and drives shaft 94 of hydraulic pump 92. Hydraulic pump 92 then actuates the hydraulic motor which, in turn, actuates the electric generator.

Figure 9:
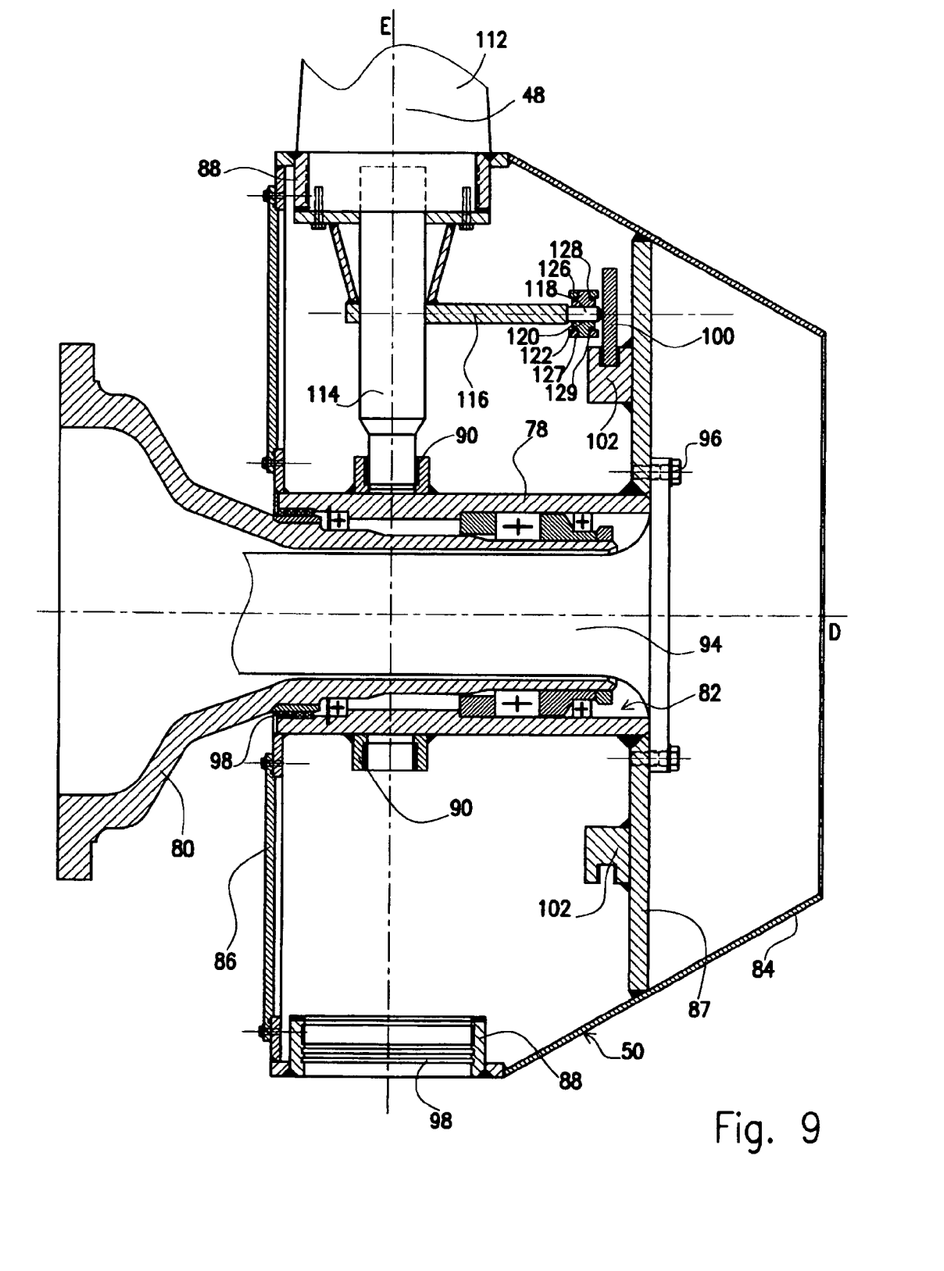
FIG. 9 shows a cross-section view of a portion of the turbine of FIG. 6.

FIG. 9 shows a more detailed view of hub 50 rotatably assembled around axis D on fixed hollow tubular element 78. Only one blade 48 is partially shown. For each blade 48, bearing 88 at the level of external wall 84 of hub 50 comprises grooves 98 for arranging sealing gaskets (not shown) enabling rotation of the blade 48 associated with bearing 88 while ensuring the tightness of the internal volume of hub 50 against the water flow. Roller bearing device 82 comprises ball bearing enabling rotation of hub 50 around tubular element 78 and roller bearings also enabling load transfer along axis D. Indeed, the flow on wheel 34 generates a drive torque along axis D and a load along axis D from upstream to downstream of the flow. A sealing device 98 avoids penetration of water into the space separating internal cylindrical portion 78 from tubular element 80.

Figure 10:
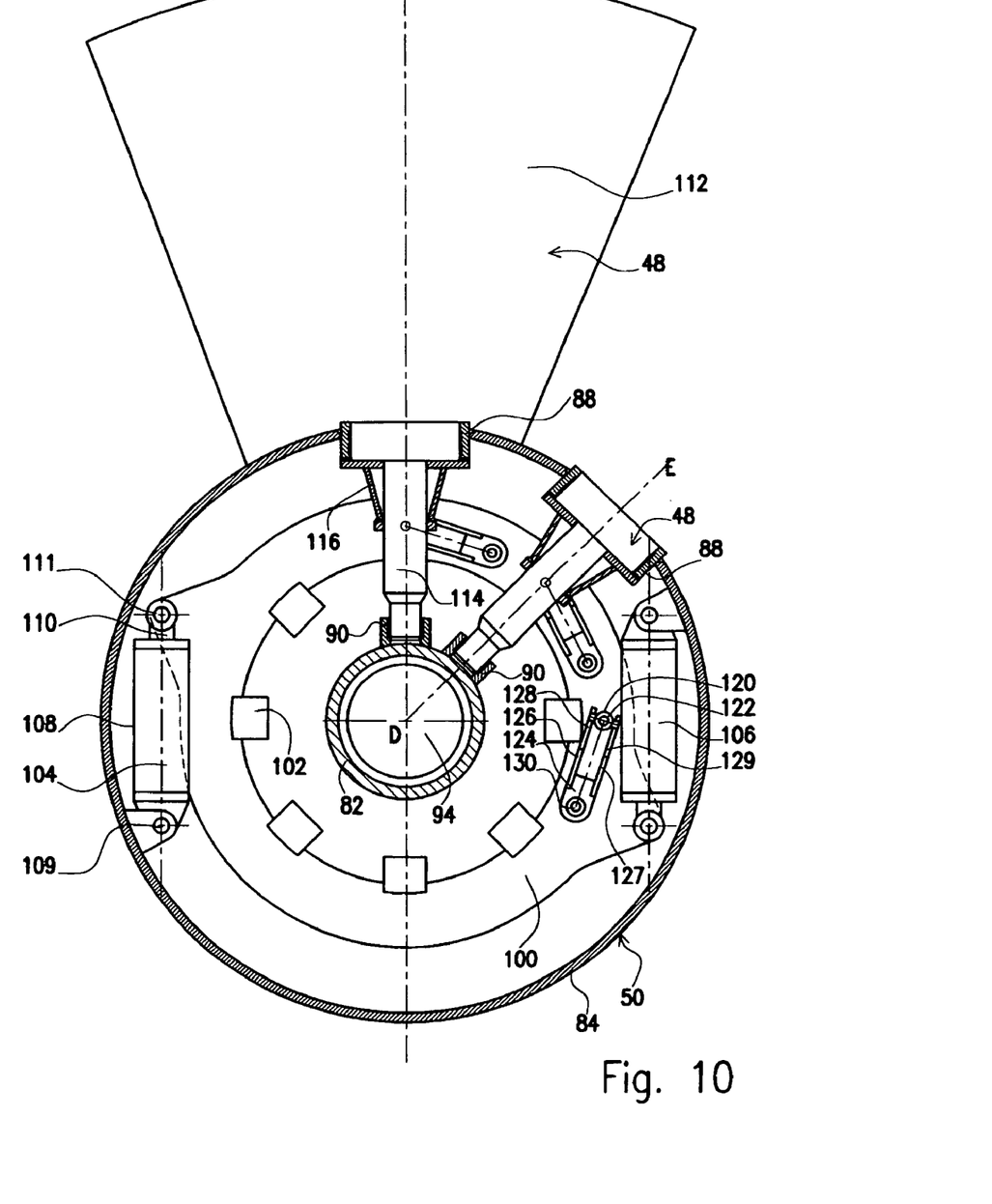
FIG. 10 shows a cross-section view of FIG. 9 according to a plane perpendicular to the turbine axis.

FIG. 10, along with FIG. 9, shows in more detailed fashion the orientation mechanism of blades 48 of wheel 34. In FIG. 10, only bearings 88, 90 associated with two blades 48 are shown, one blade 48 being shown entirely, the other blade 48 being shown partially. The orientation mechanism of blades 48 comprises a ring-shaped element 100, partially shown in FIG. 9, arranged in a plane perpendicular to axis D. Ring-shaped element 100 is maintained by support elements 102 distributed along the circumference of rear wall 87 of hub 50. Support elements 102 allow the rotating of ring-shaped element 100 around axis D. Such a rotation is obtained by means of two hydraulic jacks 104, 106, not shown in FIG. 9. The feeding with oil under pressure of hydraulic jacks 104 is not shown. Each hydraulic jack 104, 106 comprises a cylinder 108 assembled on external portion 84 of hub 50 by a pivotal connection 109, and a rod 110 sliding in cylinder 108 and connected by a pivotal connection 111 to ring-shaped element 100.

Each blade 48 comprises a blade body 112 which prolongs in a cylindrical joining piece 114. The free end of cylindrical joining piece 114 is assembled in bearing 90 and the end of cylindrical joining piece 114 connected to the body of blade 112 is mounted in bearing 88. Each blade 48 is rotated around its axis by a lever 116 which is attached to blade 48 at the level of cylindrical joining piece 114 and the opposite end 118 of which is shaped as a cylindrical rod. A cap 120 is capable of displacing rod-shaped end 118 of lever 116 and comprises a central bore 122 in which rod-shaped end 118 slides. With each blade 48 is associated a connection 124 which comprises two parallel arms 126, 127, each having a groove 128, 129 which extends along a direction substantially contained in a plane perpendicular to axis D. Cap 120 is capable of sliding in grooves 128, 129. Cap 120 is further pivotally assembled with respect to connection 124 along an axis perpendicular to the direction of grooves 128, 129. Connection 124 is attached to ring-shaped element 100 via a pivot 130.

The orientation of blades 48 enables adapting the flow of turbine 30 to the flow of the head. The orientation mechanism of blades 48 enables synchronization of the pivoting of blades 48. The actuation of hydraulic jacks 104, 106 pivots ring-shaped element 100 around axis D. The rotating of ring-shaped element 100 causes the displacement of connections 124, of caps 120, and of levers 116 and finally causes the rotation of each blade 48 around its axis.

The profile of blades 48 is defined to enable overlapping of a blade on an adjacent blade according to a continuous contact line. By arranging each blade so that it can cover the adjacent blade, the water flow in opening 62 of carter 32 is stopped by the closing of blades 48 and thus the stopping of turbine 30. This enables avoiding use of a stop gate or of an adjustable distributor. On closing of the blades, a floating body may break in between two blades 48. Grooves 128, 129 enable for one of blades 48 to remain in a partially closed position while the other blades totally close. The floating body can be eliminated at the next opening of blades 48. The hydraulic shape of blades 48 is designed to give these blades a hydraulic torque around their axis E tending to drive blades 48 towards their closing. This arrangement provides stopping turbine 30 by simple releasing of hydraulic jacks 104 and 106.

The diameter of several meters of wheel 34 is such that the average velocity of the flow at the wheel outlet is low as compared to the head. This enables decreasing to a minimum the dimensions of downstream portion 68 of opening 62 which forms the draft tube. The low speed of crossing of wheel 34 implies a very low rotation speed as compared with conventional current turbines harnessing low head or very low head hydroelectric power plants.

According to a variation of the present invention, the transmission of the torque provided by shaft 96 may be ensured by step-up gears.

According to another variation of the present invention, a slow electric generator, capable of being driven by a shaft having a low rotation speed, may be provided directly instead of hydraulic pump 92 at the level of fixed end box 52 or in hub 50.

Figure 11:
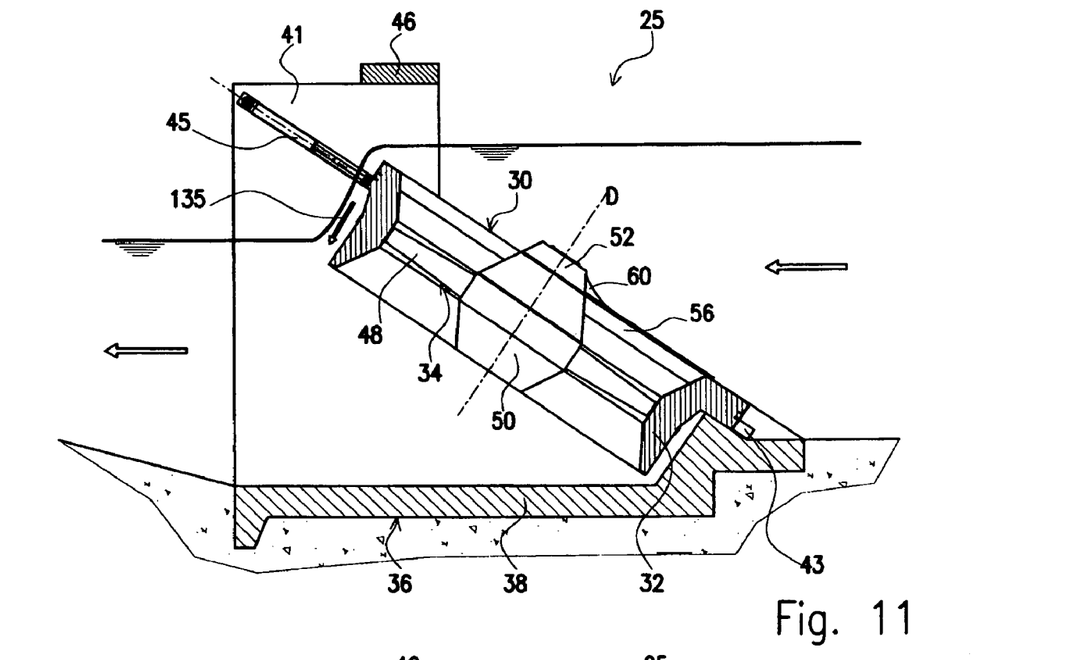
FIGS. 11 to 13 show different positions of use of the hydroelectric power plant according to the present invention.
Figure 12:
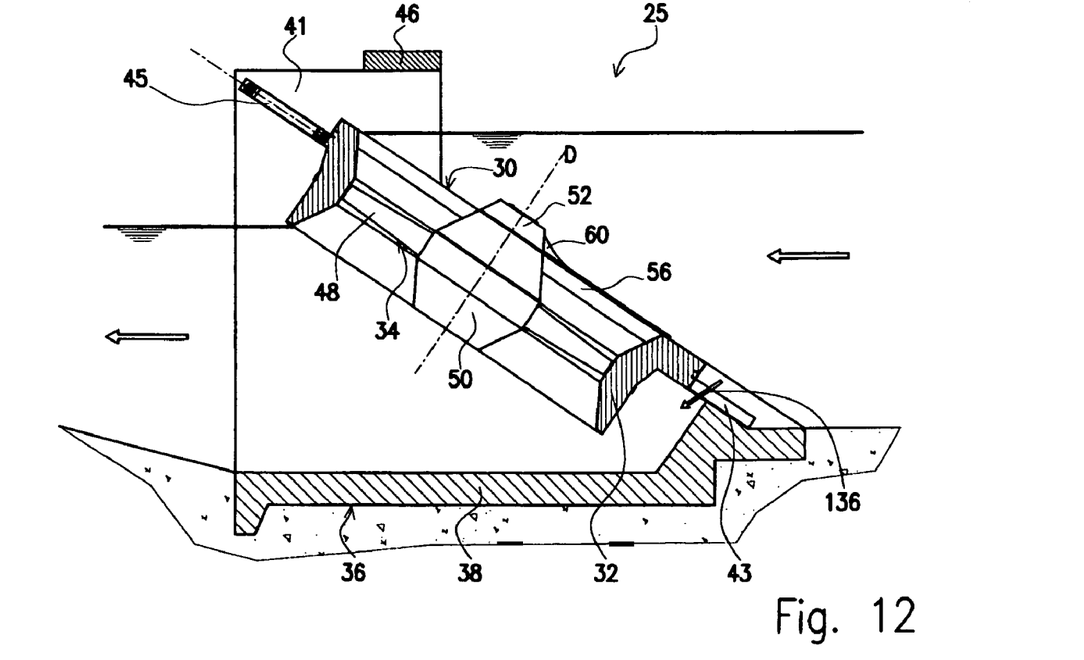

FIGS. 11 and 12 show two specific positions of use of turbine 30 according to the present invention enabling removing the bulky bodies which accumulate against distributor 54 during the use of turbine 30. Indeed, the automatic screen washing system tends to displace the bulky bodies which accumulate on distributor 54 at the level of the top or of the base of distributor 54 according to the density of the bulky bodies. Hydraulic jacks 44, 45 may displace turbine 30 in a low position shown in FIG. 11. The low position enables evacuation of the bulky bodies which have accumulated at the top of distributor 54 and which are then driven by the flow, as indicated by arrow 135. Hydraulic jacks 44, 45 can displace turbine 30 to a high position, shown in FIG. 12. The high position enables evacuation of the bulky bodies accumulated at the base of distributor 54 and which are then driven by the flow, as shown by arrow 136.

Figure 13:
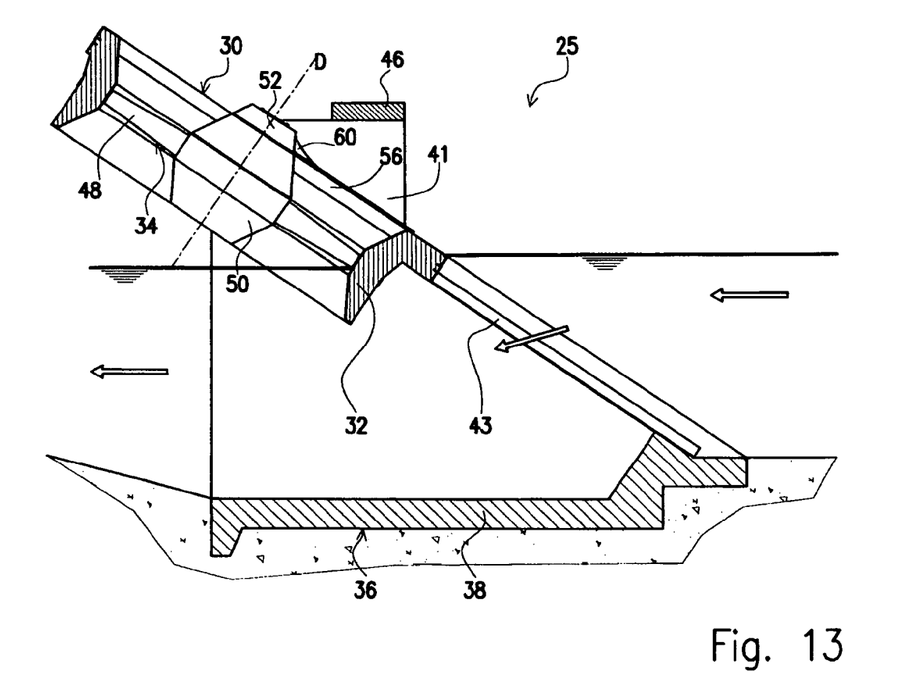

FIG. 13 shows the hydroelectric power plant according to the present invention in which turbine 30 is placed in a high limiting position where it is mostly out of the flow. Hub 50 and fixed box 52 are then accessible from platform 46, for example, for maintenance operations. For more significant maintenance operations, turbine 30 can be totally removed from support element 36.

According to a variation of the present invention, converging upstream portion 64, behaving as a water intake passage, and diverging downstream portion 68, behaving as a draft tube, are of small and possibly different dimensions. Converging upstream portion 64 and/or diverging downstream portion 68 may be absent, and opening 62 can then be completely cylindrical.

The present invention has many advantages.

First, it enables decreasing to a minimum, or even suppressing, the converging portion of the carter forming the water intake passage and, more specifically, the diverging portion of the carter forming the draft tube. This enables decreasing the carter dimensions in the wheel shaft direction, and the dimensions of the support on which the carter is assembled. Further, the diverging and converging portions being of small dimensions, they may be formed at the level of the carter which is generally formed of mechanically welded mechanical portions. The converging and diverging portions are no longer formed of concrete constructions of large dimensions, of high manufacturing cost. The manufacturing cost of the hydroelectric power plant according to the present invention is thus decreased. Further, since the hydroelectric power plant according to the present invention takes up a small volume, it can very easily be installed on existing sites.

Second, the small velocity of the flow crossing the wheel, the large size and the slow rotation speed of the wheel result in that the turbine according to the present invention is particularly well adapted to the passing of fish, in upstream as well as in downstream migration. It is then no longer necessary to provide a fish ladder reserved to fish next to the hydroelectric power plant.

Third, according to a specific embodiment of the present invention, the wheel blades are adjustable and may close back on one another and then behave as a gate by stopping the flow through the turbine. It is thus not necessary to provide a gate or a mobile distributor, generally arranged upstream of the turbine and dedicated to stopping the flow. This enables further decreasing the dimensions of the hydroelectric power plant according to the present invention.

Fourth, according to a specific embodiment of the present invention, the distributor may be used as the wheel protection screen by avoiding for bulky bodies to reach the wheel. It is thus not necessary to provide a dedicated protection screen which must generally be provided upstream of the turbine. This enables even further decreasing the dimensions of the hydroelectric power plant according to the present invention.

The invention claimed is:

1. A turbine for a hydroelectric power plant intended to equip a water stream at the level of a very low head lower than 10 meters comprising:
   a helix-shaped wheel,
   a carter crossed by an opening comprising a cylindrical portion, the wheel comprising blades arranged at the level of the cylindrical portion,
   a hub on which the blades are assembled,
   a fixed box, the hub being rotatably assembled on the fixed box, and
   a distributor upstream of the wheel with respect to the water flow and comprising profiles connecting the fixed box to the carter,
   wherein the opening comprises a converging portion upstream of the cylindrical portion with respect to the water flow and a diverging portion downstream of the cylindrical portion with respect to the water flow, the ratio between the thickness of the carter according to the rotation axis of the wheel and the wheel diameter being smaller than 0.5, and wherein the wheel comprises a diameter and rotational speed configured to produce a target ratio (K) between the kinetic energy of the water flow having a velocity (V) coming out of the wheel and the potential energy of the head (H) of the water stream entering the wheel is defined by the relationship $K=(100V^2)/2gH$, wherein K is smaller than 20%.

2. The turbine of claim 1, in which the diameter of the wheel is greater than 3 meters.

3. The turbine of claim 1, in which the rotation speed of the wheel is lower than 50 revolutions per minute.

4. The turbine of claim 1, in which the distributor comprises profiles distributed in a star around the fixed box, the turbine comprising a screen washing system upstream of the distributor with respect to the water flow and comprising at least one arm rotatably assembled around the fixed box to drive away bulky bodies maintained against the distributor.

5. The turbine of claim 1, comprising means for orienting the blades to close the opening of the carter.

6. The turbine of claim 1, comprising a hydraulic pump driven by the wheel.

7. A hydroelectric power plant intended to equip a water stream at the level of a very low head lower than 10 meters, comprising:
   a turbine (30) comprising a helix-shaped wheel,
   a support delimiting a flow passage in which the head is created and in which the turbine is arranged, and comprising means for displacing the turbine with respect to the support between a first position where the turbine completely closes the passage and at least one second position where the turbine partially closes the passage,
   wherein the wheel comprises a diameter and rotational speed configured to produce a target ratio K between the kinetic energy of the water flow having a velocity (V) coming out of the wheel and of the potential energy of the head (H) of the water stream entering the wheel is defined by the relationship $K=(100V^2)/2gH$, wherein K is smaller than 20% such that the turbine avoids having a draft tube arranged downstream of the turbine.

8. A method of operating a turbine of a hydroelectric power plant in a low head water stream, the method comprising:
   configuring the turbine to achieve a target ratio (K) between the kinetic energy of the water flow exiting the turbine and the potential energy of the head to be less than 20%, wherein the ratio is defined by $K=(100V^2)/2gH$, where g is the gravitational constant, V is the velocity of the water stream output from the turbine and H is the head height, wherein when operating the turbine in the low head water stream of height H, the target ratio is achieved, and
   displacing the turbine with respect to a support between a first position where the turbine completely closes a passage and at least one second position where the turbine partially closes the passage, wherein the support delimits the flow passage in which the head is created and in which the turbine is arranged.

9. The method of claim 8, further comprising the step of:
   determining the output velocity of the water stream from the turbine required to achieve the target ratio (K) of less than 20%.

10. The method of claim 8, wherein the step of configuring the turbine comprises selecting the diameter and rotational speed of a wheel of the turbine in order to achieve the target ratio (K) of less than 20%.

* * * * *